United States Patent
Li (12)

(10) Patent No.: US 8,215,882 B2
(45) Date of Patent: Jul. 10, 2012

(54) HELICAL MULTILEVEL CUTTING TOOL

(76) Inventor: Shiqing Li, Shandong (CN)

( * ) Notice: Subject to any disclaimer, the term of this patent is extended or adjusted under 35 U.S.C. 154(b) by 895 days.

(21) Appl. No.: 12/092,030

(22) PCT Filed: Oct. 31, 2005

(86) PCT No.: PCT/CN2005/001797
§ 371 (c)(1),
(2), (4) Date: Aug. 20, 2008

(87) PCT Pub. No.: WO2007/051344
PCT Pub. Date: May 10, 2007

(65) Prior Publication Data
US 2009/0047084 A1    Feb. 19, 2009

(51) Int. Cl.
*B23B 51/02* (2006.01)
*B23C 5/10* (2006.01)

(52) U.S. Cl. ................ 408/230; 407/54; 408/223

(58) Field of Classification Search .......... 408/223–225, 408/227, 230; 407/53–54; *B23B 51/00, B23B 51/02; B23C 5/04, 5/10*
See application file for complete search history.

(56) References Cited

U.S. PATENT DOCUMENTS

| | | | | | |
|---|---|---|---|---|---|
| 599,537 | A | * | 2/1898 | Steudner | 408/223 |
| 867,639 | A | * | 10/1907 | Bragg | 408/223 |
| 1,407,546 | A | * | 2/1922 | Joseph | 408/223 |
| 2,646,701 | A | * | 7/1953 | Letien | 408/56 |
| 5,078,554 | A | * | 1/1992 | Kubota | 408/230 |
| 5,160,232 | A | * | 11/1992 | Maier | 408/223 |
| 6,213,692 | B1 | * | 4/2001 | Guehring et al. | 408/144 |

FOREIGN PATENT DOCUMENTS

| | | | | |
|---|---|---|---|---|
| DE | 3936747 | A1 | * | 5/1991 |
| JP | 58165909 | A | * | 10/1983 |
| JP | 63278708 | A | * | 11/1988 |
| JP | 01045504 | A | * | 2/1989 |
| JP | 03196908 | A | * | 8/1991 |
| JP | 03245914 | A | * | 11/1991 |
| JP | 2003275913 | A | * | 9/2003 |

* cited by examiner

*Primary Examiner* — Daniel Howell
(74) *Attorney, Agent, or Firm* — Greenberg Traurig, LLP

(57) ABSTRACT

A helical multilevel cutting tool has high heat emission efficiency, great strength and excellent durability, and can be positioned easily during drilling operation. The cutting tool includes a cutter shank and a cutter head which are integrally formed, wherein the cutter head is provided with several helical pieces integrally, each helical piece has a cutting blade thereon, a heat emission platform is formed along the cutting blade, a second cutting blade which faces forwardly as viewed in the direction of the cutting operation is formed in front of the heat emission platform, and a cutting blade outer surface is formed between the heat emission platform front surface and the second cutting blade. An outer front cutting blade is formed on the top surface of the cutter head at a position where the blade meets the heat emission platform front surface, and a front cutting blade is formed between the second cutting blade and the center of the cutter head top surface.

8 Claims, 4 Drawing Sheets

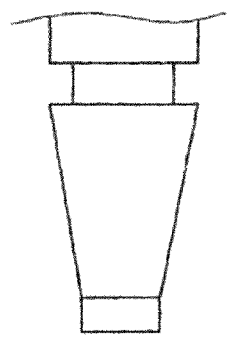
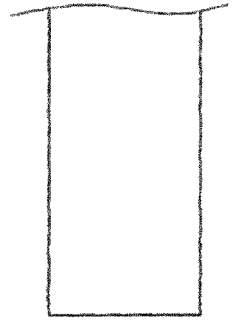
Fig. 6A    Fig. 6B
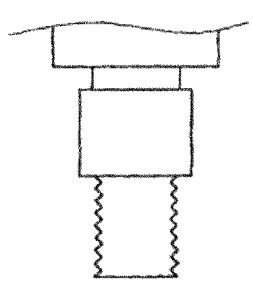
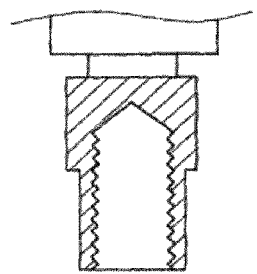
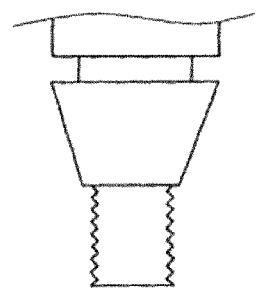
Fig. 6C    Fig. 6D    Fig. 6E
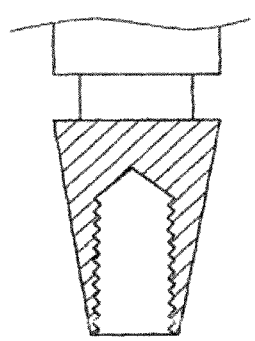
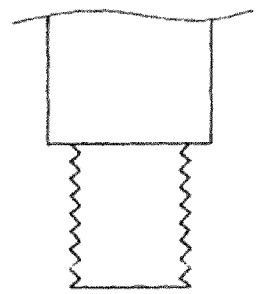
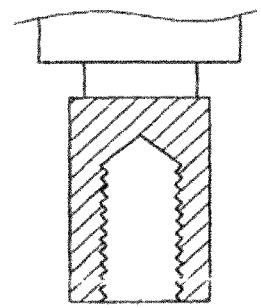
Fig. 6F    Fig. 6G    Fig. 6H

HELICAL MULTILEVEL CUTTING TOOL

TECHNICAL FIELD

This invention relates to a helical multilevel cutting tool which is used in machining operations of a drilling machine, a milling machine, a boring machine, and etc.

BACKGROUND ART

At present, a twist drill used in machining operations comprises a lateral edge, a cutting blade, and a helical sub-edge platform, and a sub-edge substantially exhibits a single convex shape. Though a milling cutter has a structure in which its sub-edge and cutting edge are distributively set as three edges, four edges, five edges, etc., there is no great difference between its sub-edge and cutting edge and those of the twist drill. Such twist drill and milling cutter, when drilling (milling) work pieces of relatively high hardness, are liable to generate a large amount of heat, cause the hardness of the cutter heads to be low, and result in the wear of the cutter heads, and at same time such cutter heads have a defect that they are liable to be broken. Further, since the cutting edges on both sides of the cutter head are symmetrical in operation, and generally the cutting amount ranges only from about dozens of micrometers to 1 mm, the height of the repairing and grinding angle is difficult to be grasped when being repaired and ground. In addition, in those twist drills and milling cutters, since the center position of the cutter head can not be easily grasped, the problems are liable to be caused that the location is not accurate, that the precision of the machined hole is not qualified, that waste products is easily resulted, and at the same time a thinner work piece, when being machined, can be raised up to cause injury and accidents.

SUMMARY OF THE INVENTION

In view of the problems described above the present invention is made for the purpose of providing a new type of helical multilevel cutting tool, which has high heat emission efficiency, great strength and excellent durability, and can be positioned easily during drilling operation.

In order to achieve the above object, the present invention employs following technical solution:

A helical multilevel cutting tool comprises a cutter shank and a cutter head which are integrally formed, characterized by that: the cutter head is provided with several helical pieces integrally, each helical piece has a cutting blade thereon, a heat emission platform is formed along the cutting blade, a second cutting blade which faces forwardly as viewed in the direction of the cutting operation is formed in front of the heat emission platform, a cutting blade outer surface is formed between the heat emission platform front surface and the second cutting blade, an outer front cutting blade is formed on the top surface of the cutter head at a position where the blade meets the heat emission platform front surface, and a front cutting blade is formed between the second cutting blade and the center of the cutter head top surface.

Preferably, there is formed a helical positioning platform protruding from the position of the cutter axis to the second cutting blade on the front cutting surface of each helical piece.

Preferably, there is formed a groove on said helical positioning platform.

Preferably, there is formed at least one level of helical multilevel blade between the second cutting blade and the side surface of said helical positioning platform.

Preferably, a concave helical multilevel blade is included in said helical multilevel blade.

Preferably, the length of said outer front cutting blade is equal to or less than a half of the radius from the outer side surface of the heat emission platform to the cutter axis.

Preferably, the perpendicular distance of the side surface of said helical positioning platform with respect to the cutter axis is equal to or less than a half of the radius from the outer side surface of the heat emission platform to the cutter axis.

Preferably, the angle included between the front surface of said heat emission platform and the cutting blade outer surface at their joint is at least 90°.

Preferably, said helical pieces are at least two.

Preferably, the cutter shank is one of the following types: a cone shank, a straight shank, a cylinder positioned screw shank, a cylinder positioned thread-hole shank, a cone positioned screw shank, a cone positioned thread-hole shank, an end-surface platform positioned screw shank, and an end-surface platform positioned thread-hole shank.

BRIEF DESCRIPTION OF THE DRAWINGS

The technical solution and advantages of the present invention will be illustrated in detail in conjunction with the accompanying drawings, in which:

FIGS. 6A-6H shows schematic views of various cutter shanks, wherein (FIG. 6A) represents a cone shank, (FIG. 6B) a straight shank, (FIG. 6C) a cylinder positioned screw shank, (FIG. 6D) a cylinder positioned thread-hole shank, (FIG. 6E) a cone positioned screw shank, (FIG. 6F) a cone positioned thread-hole shank, (FIG. 6G) an end-surface platform positioned screw shank, and (FIG. 6H) an end-surface platform positioned thread-hole shank.

DETAILED DESCRIPTION OF THE PREFERRED EMBODIMENT

The preferred embodiments of a helical multilevel cutting tool of the present invention will be illustrated below in detail in conjunction with the accompanying drawings, and in the first to fourth embodiments the cutting tool having two helical pieces is mainly illustrated as examples.

First Embodiment

Figure 1:
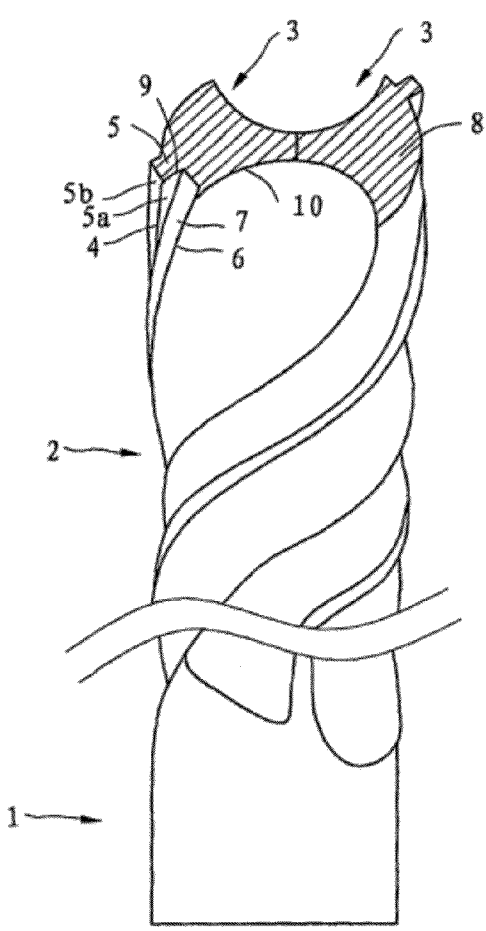
FIG. 1 is a schematic view of a cutting tool of the first embodiment of the invention.

As shown in FIG. 1, a helical multilevel cutting tool of the first embodiment of the invention comprises a cutter shank 1 and a cutter head 2 which are integrally formed, the cutter head 2 is provided with several helical pieces 3 . . . 3 integrally, each helical piece 3 has a cutting blade 4 thereon, a heat emission platform 5 is formed along the cutting blade 4, a second cutting blade 6 which faces forwardly as viewed in the direction of the cutting operation is formed in front of the heat emission platform 5, a cutting blade outer surface 7 is formed between the front surface 5a of the heat emission platform 5 and the second cutting blade 6, an outer front cutting blade 9 is formed on the top surface 8 of the cutter head 2 at a position where the top surface 8 meets the front surface 5a of the heat emission platform 5, and a front cutting blade 10 is formed on the position between the second cutting blade 6 and the center of the top surface 8. In addition, the length of said outer front cutting blade 9 is equal to or less than a half of the radius from the outer side surface 5b of the heat emission platform 5 to the cutter axis, and the angle included between the front surface 5a of said heat emission platform 5 and the cutting blade outer surface 7 at their joint is at least 90° and may also be transitioned by an arc.

According to the structure described above, since on each helical piece 3 there is formed the heat emission platform 5 along the cutting blade 4, and the second cutting blade 6 which faces forwardly as viewed in the direction of the cutting operation is formed in front of the heat emission platform 5, there is added one new second cutting blade 6 in comparison with the conventional cutter head, so that the two cutting blades can perform operation, thereby capable of resolving the cutting force of the cutting blade, lowing the friction strength of the cutting blade, causing the heat generated by friction to be reduced, at the same time also increasing the heat emission area of the cutter head, lowing the temperature of the cutter head, extending the use life of the cutter, and always remaining high strength in the machining process.

As shown in FIG. 6(A)-FIG. 6(H), the cutter shank 1 may be formed into various structures according to machining requirements, for example, when being applied to a drilling machine to perform drilling operation, may be a common cone shank (FIG. 6A) or a straight shank (FIG. 6B); and when being applied to a milling machine to perform milling operation, may be a cylinder positioned screw shank (FIG. 6C), a cylinder positioned thread-hole shank (FIG. 6D), a cone positioned screw shank (FIG. 6E), a cone positioned thread-hole shank (FIG. 6F), an end-surface platform positioned screw shank (FIG. 6G), an end-surface platform positioned thread-hole shank (FIG. 6H) and etc.

By making the cutter shank have the structures described above, the cutting tool of the invention can widen its application scope and can be used in many machining operations.

Second Embodiment

Figure 2:
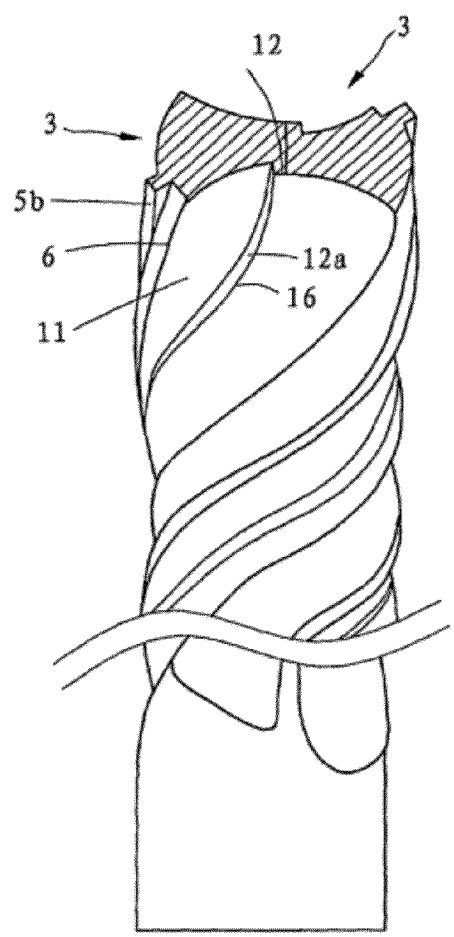
FIG. 2 is a schematic view of a cutting tool of the second embodiment of the invention.

As shown in FIG. 2, a helical multilevel cutting tool of the second embodiment of the invention, based on the structure of the first embodiment, is formed with a helical positioning platform 12 protruding from the position of the cutter axis to the second cutting blade 6 on the front cutting surface 11 of each helical piece 3. In the second embodiment, the perpendicular distance of the side surface 12a of said helical positioning platform 12 with respect to the cutter axis is equal to or less than a half of the radius from the outer side surface 5b of the heat emission platform 5 to the cutter axis. When the drilling cutter is relatively small, such as φ4 mm, the second cutting blade 6 and the positioning platform cutting blade 16 coincide into one integral body.

By such configuration, on the base of technical effects of the first embodiment, since the protruding helical positioning platform 12 is formed on the front cutting surface 11 of each helical piece 3, there is formed a positioning center comparison with the prior conventional cutter head, so that the better positioning can be performed during machining operations to further improve the machining precision, and the problem can be prevented that a thinner work piece, when being drilled, can be raised up due to the unstable positioning.

The cutter shank of this embodiment can employ the same structure as that of the first embodiment, and therefore its illustration is omitted here.

Third Embodiment

Figure 3:
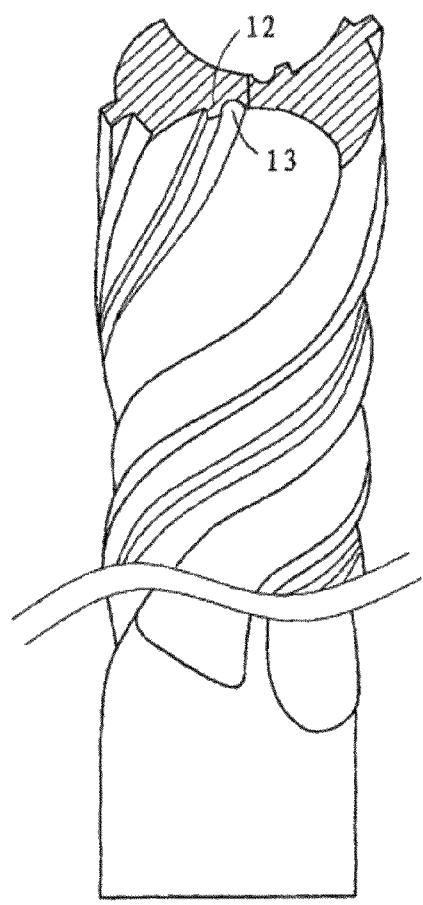
FIG. 3 is a schematic view of a cutting tool of the third embodiment of the invention.

As shown in FIG. 3, a helical multilevel cutting tool of the third embodiment of the invention, based on the structure of the second embodiment, is formed with a groove 13 on said helical positioning platform 12.

By such configuration, on the base of technical effects of the second embodiment, since the groove 13 is formed on said helical positioning platform 12, the positioning can be further enhanced, and at same time the heat emission efficiency is improved because of the increase of the heat emission area.

The cutter shank of this embodiment can employ the same structure as that of the first embodiment, and therefore its illustration is omitted here.

Fourth Embodiment

Figure 4:
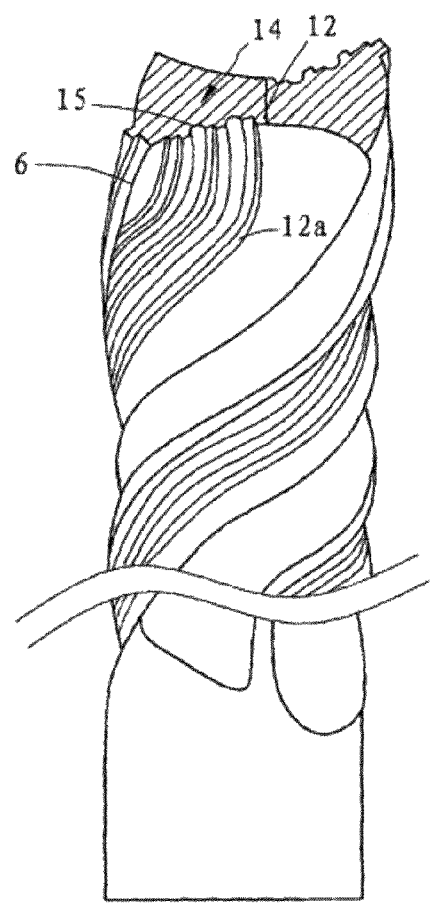
FIG. 4 is a schematic view of a cutting tool of the fourth embodiment of the invention.

As shown in FIG. 4, a helical multilevel cutting tool of the fourth embodiment of the invention, based on the structure of the second embodiment, is formed with a three-level helical blade 14 between the second cutting blade 6 and the side surface 12a of said helical positioning platform 12, in the three-level helical blade 14, a two-level concave helical blade 15 is included.

By such configuration, on the base of technical effects of the second embodiment, since there is formed the three-level helical blade 14 including the two-level concave helical blade 15, the cutting force of the front cutting blade 10 can be further resolved and reduced, thereby reducing the amount of the heat emission, at the same time being capable of further increasing the heat emission area of the cutter head, lowing the temperature of the cutter head, extending the use life the cutting tool, and always remaining high strength in the drilling operation to improve operation efficiency.

The cutter shank of this embodiment can employ the same structure as that of the first embodiment, and therefore its illustration is omitted here.

Figure 5:
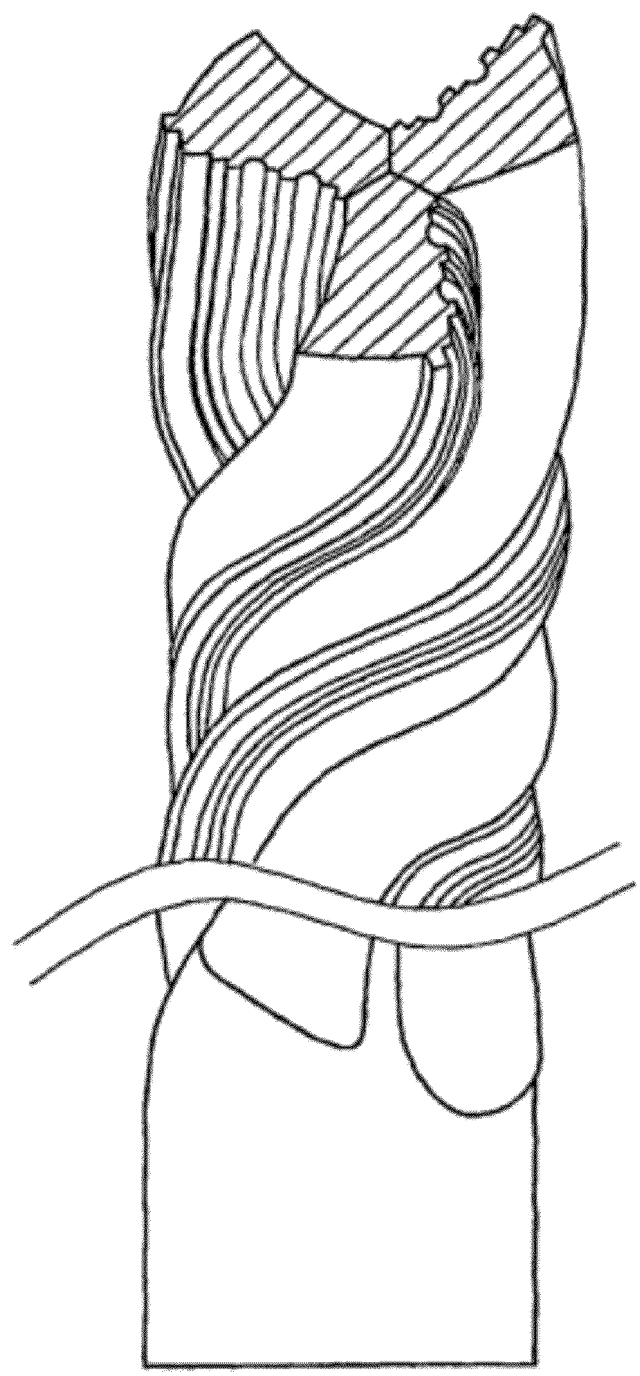
FIG. 5 is a schematic view of a cutting tool having three helical pieces.

Although the cutting tool having two helical pieces is illustrated as examples, the cutting tool of the invention may also have more helical pieces, and various helical pieces can employ the structures of the embodiments described above and the combination of any other manners. FIG. 5 shows a cutting tool having three helical pieces 3, the structure of each of which is the same as that of the fourth embodiment.

The preferred embodiments described above is illustrative rather than limiting, and the invention can also be embodied and practiced in other manners without departing from the main point and basic features of the invention. The scope of the invention is defined by claims, and all alternations within the scope defined by claims fall in the scope of the invention.

The invention claimed is:

1. A helical multilevel milling cutter, comprising a cutter shank and a cutter head which are integrally formed, characterized by that: the cutter head has a flat top surface provided with at least two helical pieces integrally, each helical piece has a cutting blade thereon, a heat emission platform is formed along the cutting blade, a second cutting blade which faces forwardly as viewed in the direction of the cutting operation is formed in front of the heat emission platform, a cutting blade outer surface is formed between the heat emission platform front surface and the second cutting blade, an outer front cutting blade is formed on the top surface of the cutter head at a position where the blade meets the heat emission platform front surface, a front cutting blade is formed between the second cutting blade and the center of the cutter head top surface, a length of the outer front cutting blade is equal to or less than a half of a radius from an outer side surface of the heat emission platform to a cutter axis, a helical positioning platform is formed protruding from the position of the cutter axis to the second cutting blade on the front cutting surface of each helical piece, a perpendicular distance of a side surface of the helical positioning platform with respect to the cutter axis is equal to or less than half of a radius from the outer side surface of the heat emission platform to the cutter axis, and a groove is formed on the helical positioning platform.

2. The helical multilevel milling cutter according to claim 1, characterized by that, there is formed at least one level of helical multilevel blade between the second cutting blade and the side surface of said helical positioning platform.

3. The helical multilevel milling cutter according to claim 2, characterized by that, a concave helical multilevel blade is included in said helical multilevel blade.

4. The helical multilevel milling cutter according to any of claim 1, characterized by that, the angle included between the front surface of said heat emission platform and the cutting blade outer surface at their joint is at least 90°.

5. The helical multilevel milling cutter according to any of claim 1, characterized by that, the cutter shank is one of the following types: a cone shank, a straight shank, a cylinder positioned screw shank, a cylinder positioned thread-hole shank, a cone positioned screw shank, a cone positioned thread-hole shank, an end-surface platform positioned screw shank, and an end-surface platform positioned thread-hole shank.

6. The helical multilevel milling cutter according to claim 2, characterized by that, the perpendicular distance of the side surface of said helical positioning platform with respect to the cutter axis is equal to or less than a half of the radius from the outer side surface of the heat emission platform to the cutter axis.

7. The helical multilevel milling cutter according to claim 2, characterized by that, the angle included between the front surface of said heat emission platform and the cutting blade outer surface at their joint is at least 90°.

8. The helical multilevel milling cutter according to claim 2, characterized by that, the cutter shank is one of the following types: a cone shank, a straight shank, a cylinder positioned screw shank, a cylinder positioned thread-hole shank, a cone positioned screw shank, a cone positioned thread-hole shank, an end-surface platform positioned screw shank, and an end-surface platform positioned thread-hole shank.

* * * * *